July 17, 1934.                J. BERGE                1,966,427
                             LOCK WASHER
                         Filed March 16, 1932

Inventor
Joseph Berge
by
Attorney

Patented July 17, 1934

1,966,427

UNITED STATES PATENT OFFICE 1,966,427

LOCK WASHER

Joseph Berge, Montclair, N. J., assignor to National Lock Washer Company, Newark, N. J., a corporation of New Jersey Application March 16, 1932, Serial No. 599,106

1 Claim. (Cl. 151—32)

My invention relates to lock washers of the split ring type, and has for its object to provide a washer that may be located within a countersunk opening, the ends of said washer having respectively outwardly and inwardly extending portions that embed themselves within the walls of the countersink and the head of a screw, so as to effectively prevent the screw from backing or becoming loosened.

To this end the washer is of a general conical shape the outer edge adapting itself to the general conical opening while the inner edge affords a countersunk portion within which the head of a screw or bolt, passed through a washer into the part to be secured, may fit, the terminals of the washer having respectively inward and outwardly extending portions that bite the screw head and the wall of said opening so as to resist the removal of the screw or bolt.

In the accompanying drawing

Similar numerals of reference denote like parts in the several figures of the drawing.

Figure 1:
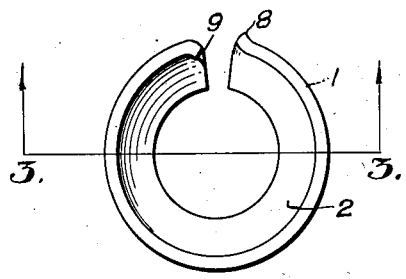
Figure 1 is a plan or top view of one form of the washer—

Referring to Figures 1 to 6 inclusive of the drawing, 1 generally denotes the washer, 2 one form of the countersunk inner face thereof, 3 one form of the inclined or conical outer face thereof, 4 the part to be secured having one form of countersink 5, and 6 a screw or bolt having a head 7 which corresponds to the countersink 5.

The upper outer corner of one end of the washer has an outwardly extending portion as shown at 8, while the upper inner corner of the other end of the washer has an inwardly extending portion as shown at 9.

Figure 4:
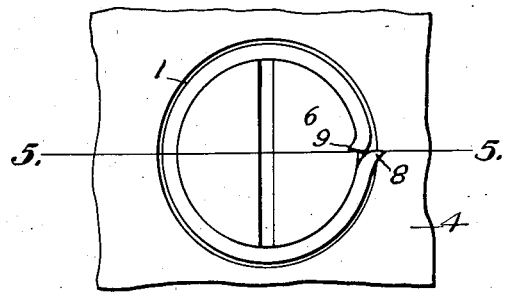
Figure 4 is a top or plan view of the washer and screw when the latter is finally driven within the part to be secured to another part—
Figure 2:
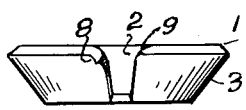
Figure 2 is a side elevation of the washer looking toward the ends—
Figure 5:
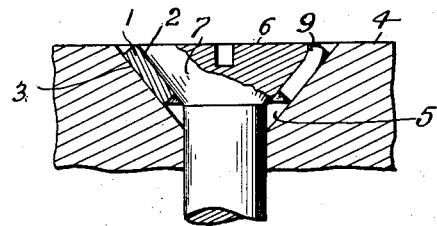
Figures 5 and 6 are sections at the line 5—5 of Figure 4, looking in opposite directions.
Figure 3:
Figure 3 is a section at the line 3—3 of Figure 1—
Figure 6:
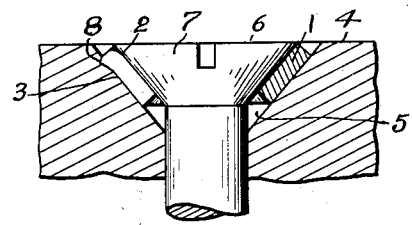

When the parts are assembled and a screw or bolt driven thereon the washer will be expanded against the wall of the countersink 5, and the bent portion 8 will embed itself within said wall, and the inwardly bent part 9 will embed itself within the head 7, as shown at Figures 4, 5 and 6. This embedding of these bent portions will effectually prevent the screw from backing or becoming loose.

Figure 7:
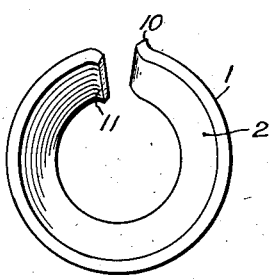
Figure 7 is a view similar to Figure 1, but showing a modified form of the invention.

It is, of course, immaterial whether a part of the ends of the washer is bent or whether the entire ends are bent, and therefore I have shown at Figure 7 a washer in which the ends throughout their extent are bent in the manner above described, as shown at 10 and 11. Likewise it is immaterial whether these inwardly extending portions are formed by bending or whether the washer is made with outwardly and inwardly extending spurs or bent portions at the ends.

While I have shown the invention as applied to a plain split ring it will, of course, be obvious that it is immaterial whether the washer be a plain ring or whether it be of helical or spiral shape since the bent or outwardly and inwardly extended portions will function precisely in the same manner irrespective of the character of the washer.

Also, it will be evident that it is immaterial whether the countersunk seat is made within a solid portion, such as the part 4, or whether it is a separate countersink element placed on top of said portion.

What is claimed is:—

A plain split ring lock washer adapted to be used in connection with a countersunk opening and a bevel headed screw, the inner and outer faces of said washer being parallel to each other and to the head of said screw and the wall of said opening at all times during expansion, said washer having upper and lower edges at all times disposed in parallel planes, the terminals of the ring that forms said washer being respectively bent inwardly and outwardly, so as to bite against the bevel of the screw head and the wall of the countersunk opening, and the inner and outer margins being expansible, their surfaces being resiliently forced throughout their entire area against the bevel of said screw head and said opening.

JOSEPH BERGE.